Patented Dec. 30, 1941

2,267,712

UNITED STATES PATENT OFFICE 2,267,712

POLYMERIZATION OF SYMMETRICAL DICHLORETHYLENE

Walter Bauer, Darmstadt, Germany

No Drawing. Application June 9, 1938, Serial No. 212,823. In Germany July 22, 1937

9 Claims. (Cl. 260—654)

The invention relates to the polymerization of symmetrical dichlorethylene.

It is known that asymmetrical dichlorethylene polymerizes readily. In contrast thereto, symmetrical dichlorethylene was regarded as not polymerizable. It has however been described that the per se not polymerizable symmetrical dichlorethylene may be polymerized in the presence of organic vinyl esters to yield joint polymers with said esters.

It has now been found that symmetrical dichlorethylene can be polymerized per se by employing peroxide catalysts, such catalysts comprising benzoyl peroxide, hydrogen peroxide, tetrahydronaphthalene peroxide, etc. Heat may be employed in conjunction with the said catalysts. Dimeric products are preferably produced by the polymerization although higher polymeric products are produced simultaneously, especially if the operations are conducted at lower temperatures without pressure. The dimeric product is obtained in a relatively short time especially when higher temperatures and pressure are used. The manufacturing operation may be conducted with a supply of a gas, e. g. nitrogen, under pressure.

The isolated reaction products, insofar as they are of low molecular weight, are liquid. They have a certain narcotic action and are very well suited for use as high boiling solvents. The products are non-combustible.

The new compounds can be used per se for technical purposes, especially as solvents, detergents, softening agents, artificial waxes, and as raw starting materials for the making of synthetic products.

Of these a particularly valuable compound is the dimeric product having the formula 1,1,2,4 tetrachlorbutene-3, having the boiling point of 82–83° C. at 17 mm. pressure.

Example 1

100 parts by weight of symmetrical dichlorethylene having a boiling point of 47–48° C. are boiled for 45 hours (using a reflux condenser) with 2 parts by weight of benzoyl peroxide. Any flocculates (flakes) formed are filtered off and the filtrate is fractionated. Unaltered dichlorethylene passes over first. When the boiling point reaches 65° C., the remainder is fractionated at 15 mm. pressure, with the following result:

| | Parts by weight |
|---|---|
| 75– 82° C | .4 |
| 82– 84° C (dimeric) | 5.8 |
| 173–210° C | 5.2 |
| Solid residue | 7.3 |

The method involved in this example can also be practised with an addition of 2 parts of tetralin peroxide. Practically the same result is obtained although the yield is smaller.

Example 2

150 parts by weight of symmetrical dichlorethylene are heated in an autoclave for 4½ hours with 3 parts by weight of benzoyl peroxide. In this case the pressure rises to 10 atmospheres. The product filtered off from small amounts of insoluble constituents is first freed from unaltered dichlorethylene by distillation at ordinary pressure, and the higher boiling portion fractionated at 17 mm. presure:

| | Parts by weight |
|---|---|
| 75–82° C | 2.3 |
| 82–83° C (dimeric) | 24.4 |
| 83–85° C | 2.4 |
| 137–175° C | 8.7 |
| Solid residue | 3.3 |

The specific gravity of the dimeric fraction is 1.482 at 15° C.

Example 3

1000 parts by weight of symmetrical dichlorethylene are treated with 20 parts by weight of benzoyl peroxide and heated for 8½ hours to 80° C. in an autoclave after having previously added 28 atmospheres of nitrogen. The heating causes the pressure in the autoclave to rise to 36 atmospheres.

The product, purified by filtration, is freed from unaltered dichlorethylene by distillation under normal pressure. The high boiling portions are then fractionated under 15 mm. pressure:

| | Parts by weight |
|---|---|
| 65–75° C | 7.0 |
| 75–80° C | 13.7 |
| 80–90° C | 208.5 |
| 90–100° C | 15.8 |
| 100–150° C | 6.4 |
| 150–190° C | 41.4 |
| 190–222° C | 12.0 |
| Solid residue | 10.4 |

Decomposition occurs above 222° C.

I claim:

1. A method for producing technically valuable chlorinated hydrocarbons which consists in polymerizing symmetrical dichlorethylene with the aid of at least one peroxide selected from the group consisting of benzoyl peroxide, hydrogen peroxide, and tetrahydronaphthalene peroxide.

2. A method for producing technically valuable chlorinated hydrocarbons which consists in polymerizing symmetrical dichlorethylene with the aid of at least one peroxide selected from the group consisting of benzoyl peroxide, hydrogen peroxide, and tetrahydronaphthalene peroxide, in conjunction with the action of heat.

3. A method for producing technically valuable chlorinated hydrocarbons which consists in polymerizing symmetrical dichlorethylene with the aid of at least one peroxide selected from the group consisting of benzoyl peroxide, hydrogen peroxide, and tetrahydronaphthalene peroxide, under pressure.

4. A method for producing technically valuable chlorinated hydrocarbons which consists in polymerizing symmetrical dichlorethylene with the aid of at least one peroxide selected from the group consisting of benzoyl peroxide, hydrogen peroxide, and tetrahydronaphthalene peroxide, and isolating the products by fractional distillation.

5. A method for producing technically valuable chlorinated hydrocarbons which consists in polymerizing symmetrical dichlorethylene with the aid of at least one peroxide selected from the group consisting of benzoyl peroxide, hydrogen peroxide, and tetrahydronaphthalene peroxide, in conjunction with the action of heat, and isolating the products by fractional distillation.

6. A method for producing technically valuable chlorinated hydrocarbons which consists in polymerizing symmetrical dichlorethylene with the aid of at least one peroxide selected from the group consisting of benzoyl peroxide, hydrogen peroxide, and tetrahydronaphthalene peroxide, under pressure, and isolating the products by fractional distillation.

7. A method for producing technically valuable chlorinated hydrocarbons which consists in polymerizing symmetrical dichlorethylene having a boiling point of 47–48° C. with the aid of at least one peroxide selected from the group consisting of benzoyl peroxide, hydrogen peroxide, and tetrahydronaphthalene peroxide, and isolating the products by fractional distillation.

8. Distillable lower polymeric reaction products obtained from symmetrical dichlorethylene which has been treated with at least one peroxide selected from the group consisting of benzoyl peroxide, hydrogen peroxide, and tetrahydronaphthalene peroxide.

9. As a new compound 1,1,2,4, tetrachlorbutene-3 having a boiling point of 82–83° C. at 17 mm. pressure.

WALTER BAUER.